US012441180B2

(12) United States Patent
Stephan et al.

(10) Patent No.: US 12,441,180 B2
(45) Date of Patent: Oct. 14, 2025

(54) MULTIPLE-GEAR-RATIO PORTAL GEAR BOX

(71) Applicant: Super ATV, LLC, Madison, IN (US)

(72) Inventors: Jordan E. Stephan, Hanover, IN (US); Justin L. Eaton, Madison, IN (US); Jason T. Stewart, Harvest, AL (US)

(73) Assignee: Super ATV, LLC, Madison, IN (US)

( * ) Notice: Subject to any disclaimer, the term of this patent is extended or adjusted under 35 U.S.C. 154(b) by 0 days.

(21) Appl. No.: 18/999,212

(22) Filed: Dec. 23, 2024

(65) Prior Publication Data

US 2025/0214419 A1  Jul. 3, 2025

Related U.S. Application Data

(63) Continuation of application No. 18/478,245, filed on Sep. 29, 2023, now Pat. No. 12,187,118, which is a continuation of application No. 17/821,484, filed on Aug. 23, 2022, now Pat. No. 11,772,486.

(60) Provisional application No. 63/237,710, filed on Aug. 27, 2021.

(51) Int. Cl.
*B60K 17/04* (2006.01)
*F16H 1/20* (2006.01)
*F16H 57/02* (2012.01)
*F16H 57/023* (2012.01)

(52) U.S. Cl.
CPC .......... *B60K 17/043* (2013.01); *F16H 1/20* (2013.01); *F16H 57/023* (2013.01); *F16H 2057/02052* (2013.01); *F16H 2057/02056* (2013.01); *F16H 2057/0235* (2013.01)

(58) Field of Classification Search
CPC ........ F16H 57/023; F16H 57/033; F16H 1/20; F16H 1/06; B60K 17/043
See application file for complete search history.

(56) References Cited

U.S. PATENT DOCUMENTS

| | | |
|---|---|---|
| 3,420,327 A | 1/1969 | Nallinger |
| 3,698,265 A | 10/1972 | Williams |
| 3,783,710 A | 1/1974 | Steinhagen |
| 3,822,757 A | 7/1974 | Spence |
| 4,111,455 A | 9/1978 | Hickman |
| 4,437,530 A | 3/1984 | De Young |
| 5,785,218 A | 7/1998 | LaLone |
| 6,254,194 B1 | 7/2001 | Capouellez |

(Continued)

FOREIGN PATENT DOCUMENTS

GB      1049140      11/1966

*Primary Examiner* — Jake Cook
(74) *Attorney, Agent, or Firm* — Woodard, Emhardt, Henry, Reeves & Wagner, LLP

(57) ABSTRACT

A portal gear box assembly effective to lift and change the gear ratio of a wheel of an off-road vehicle includes a housing, an input gear sub-assembly, an output gear sub-assembly, and an idler gear sub-assembly effective for linking the input gear to the output gear. The input gear sub-assembly includes an input gear, the output gear sub-assembly includes an output gear, and the idler gear sub-assembly includes at least one idler gear and at least one removable adaptor effective for holding the idler gear in either a first position or a second position different from the first position. The sub-assemblies may also include bearings to facilitate movement of the gears.

12 Claims, 12 Drawing Sheets

(56) References Cited

U.S. PATENT DOCUMENTS

| | | | |
|---|---|---|---|
| 6,354,976 B1 * | 3/2002 | Mills | B62M 11/16 |
| | | | 74/117 |
| 6,416,136 B1 | 7/2002 | Smith | |
| 6,513,401 B2 | 2/2003 | Bologna | |
| 6,685,275 B2 | 2/2004 | Gorges | |
| 7,047,838 B2 | 5/2006 | Varela | |
| 7,458,594 B2 | 12/2008 | Kim | |
| 7,762,372 B2 | 7/2010 | LeBlanc, Sr. | |
| 7,766,353 B2 | 8/2010 | LeBlanc, Sr. | |
| 8,851,830 B2 | 10/2014 | Brink et al. | |
| 2004/0200660 A1 | 10/2004 | Szalai | |
| 2006/0138740 A1 | 6/2006 | Nam | |
| 2007/0145816 A1 | 6/2007 | Gile | |
| 2020/0139810 A1 | 5/2020 | Smith | |
| 2020/0198396 A1 | 6/2020 | Stephan | |

* cited by examiner

MULTIPLE-GEAR-RATIO PORTAL GEAR BOX

REFERENCE TO RELATED APPLICATIONS

This application is a continuation of U.S. patent application Ser. No. 18/478,245 filed Sep. 29, 2023 which is a continuation of U.S. patent application Ser. No. 17/821,484 filed Aug. 23, 2022 which is now U.S. Pat. No. 11,772,486 which claims priority from U.S. Provisional Application No. 63/237,710, filed Aug. 27, 2021, the entire contents of which are hereby incorporated herein by reference.

FIELD OF THE INVENTION

The present invention relates generally to off-road vehicles, such as all-terrain vehicles (ATVs) and utility task vehicles (UTVs), and more particularly to portal gear boxes that may be used on such vehicles.

BACKGROUND OF THE INVENTION

Portal gear boxes may be used on each wheel of an off-road vehicle to lift the vehicle and reduce the gear ratio so that larger tires can be run. The box accepts a driveshaft and transmits that power to an output shaft that actually turns the wheel. When it is desired to have the output shaft to turn at a slower speed than the driveshaft (due, for example, to the larger wheels), gears may be used to reduce the rotational speed of the output shaft relative to the rotational speed of the driveshaft.

Three gears are typically used in each box—an input gear that is linked to and turns with (and at the same rotational speed as) the incoming driveshaft, an output gear that is linked to and turns with (and at the same rotational speed as) the output shaft (which turns the wheel), and an idler gear linking the input and output gears so that they turn in the same direction.

To change the rotational speed of the output shaft relative to the rotational speed of the incoming driveshaft, the input gear must be a different "size" than the output gear. Thus, a single turn of the driveshaft will turn the input gear one turn, but that single turn of the input gear will turn the output gear (and thus the corresponding output axle) more than one turn or less than one turn-depending on the specific gear ratio that is selected.

To accommodate a change in tire sizes, it is frequently desirable to change the gear ratio to increase or decrease the rotational speed of the output shaft relative to the rotational speed of the incoming driveshaft. To change the gear ratio, the input and/or output gears are typically exchanged with new input and/or output gears that have a different size and number of teeth than the old gears. This generally also requires changing the location and/or size of any idler gears to accommodate the potentially larger or smaller input and output gears.

Changing the gear ratio of a portal gear hub thus requires pulling and opening the hub, and replacing several gears. Since that process is difficult and time-consuming, a need exists for an assembly that makes the job easier and faster. The present invention addresses that need.

SUMMARY OF THE INVENTION

In one aspect of the invention, there is provided a portal gear box assembly effective to lift and change the gear ratio of a wheel of an off-road vehicle. The assembly preferably comprises a housing, an input gear sub-assembly, an output gear sub-assembly, and an idler gear sub-assembly effective for linking the input gear to the output gear. The input gear sub-assembly preferably comprises an input gear and associated bearings; the output gear sub-assembly preferably comprises an output gear and associated bearings; and the idler gear sub-assembly preferably comprises an idler gear and associated bearings, all of which may be retained by a removable adaptor effective for holding the idler gear in either a first position or a second position different from the first position. In some embodiments, the housing includes indents adapted to receive the various sub-assemblies and to hold them in the appropriate position within the housing. The portal gear box assembly is preferably used on all-terrain vehicles (ATV) or a utility task vehicles (UTV), with the housing including an opening to allow the vehicle axle to enter the housing and to drive the input gear, and an opening to allow an output shaft to exit the assembly.

In another aspect the invention provides a method for changing the gear ratio of a portal gear box for an all-terrain vehicle (ATV) or a utility task vehicle (UTV). The method preferably comprises: a) providing a portal gear box assembly effective to lift and change the gear ratio of a wheel of an off-road vehicle, the assembly comprising a housing, an input gear sub-assembly, an output gear sub-assembly, and an idler gear sub-assembly effective for linking the input gear to the output gear; wherein the input gear sub-assembly comprises an input gear, the output gear sub-assembly comprises an output gear, and the idler gear sub-assembly comprises an idler gear and a removable adaptor effective for holding the idler gear in either a first position or a second position different from the first position; b) installing the removable adaptor in its first position; and c) subsequently removing the removable adaptor from its first position and subsequently installing that removable adaptor in its second position.

In a third aspect of the present invention there is provided a kit for providing a portal gear box assembly effective to lift and change the gear ratio of a wheel of an off-road vehicle. In that aspect the assembly comprises a housing, an input gear sub-assembly, an output gear sub-assembly, and an idler gear sub-assembly effective for linking the input gear to the output gear. The input gear sub-assembly preferably comprises an input gear, the output gear sub-assembly preferably comprises an output gear, and the idler gear sub-assembly preferably comprises an idler gear and a removable adaptor effective for holding the idler gear in two or more selected positions. In some embodiment the kit may include two or more removable adaptors, with the user being able to select and install an adaptor appropriate to position the idler gear in any of a variety of selected positions.

DESCRIPTION OF THE INVENTION AND PREFERRED EMBODIMENTS

Figure 1:
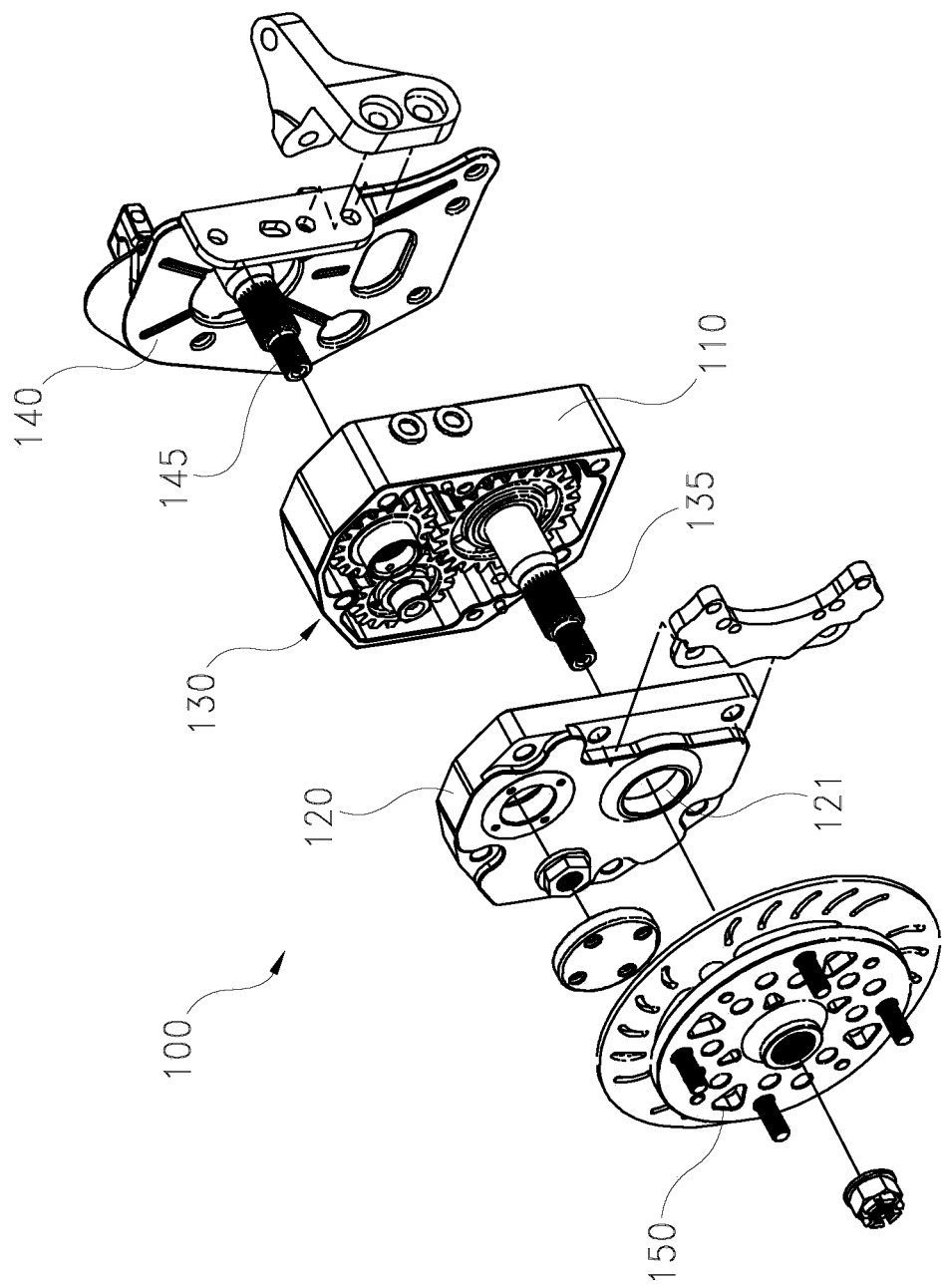
FIG. 1 is an exploded view of a portal gear box for an all-terrain vehicle or a utility task vehicle, according to one embodiment of the present invention.

For the purposes of promoting an understanding of the principles of the invention, reference will now be made to certain embodiments and specific language will be used to describe the same. It will nevertheless be understood that no limitation of the scope of the invention is thereby intended, such alterations and further modifications in the described device, and such further applications of the principles of the invention as illustrated therein, being contemplated as would normally occur to one skilled in the art to which the invention relates.

As indicated above, one aspect of the present invention relates to a portal gear box assembly effective to lift and change the gear ratio of a wheel of an off-road vehicle such as an all-terrain vehicle (ATV) or a utility task vehicle (UTV). The assembly preferably comprises a housing, an input gear sub-assembly, an output gear sub-assembly, and an idler gear sub-assembly effective for linking the input gear to the output gear. The input gear sub-assembly preferably comprises an input gear operably connectable to a driven input shaft (such as a vehicle axle), and may additionally comprise associated bearings to facilitate rotation of the shaft and/or the gear. The output gear sub-assembly preferably comprises an output gear operably connectable to an output shaft, and may additionally comprise associated bearings to facilitate rotation of the shaft and/or the gear. The output gear sub-assembly may also optionally include or drive an output axle or a wheel hub. The idler gear sub-assembly preferably comprises an idler gear, associated bearings, and an optional removable adaptor effective for holding the idler gear in either a first position or a second position different from the first position. The idler gear transfers power from the input gear to the output gear, as is known to the art.

The gear box assembly housing is adapted to hold one or more of the various gear sub-assemblies in desired position. For example, the gear box assembly housing may be adapted to receive the input gear sub-assembly and to hold it in a first input gear assembly position within the housing. The gear box assembly housing may be adapted to receive the output gear sub-assembly and to hold it in a first output gear assembly position within the housing. The gear box assembly housing may be adapted to hold the idler gear sub-assembly in a first adaptor position within the housing. For any or all of those sub-assemblies, an indent may be provided in the housing to hold the various gear assembly components in the desired position.

In some embodiments, the housing may be adapted to additionally hold any or all of its associated sub-assemblies in a second position different from the first position. For example, the gear box assembly housing may be adapted to hold the output gear sub-assembly in a first position in which the output shaft is directly below the input shaft, or in a second position in which the output shaft is forward (preferably for a front wheel) or rearward (preferably for a rear wheel) of the input shaft. This allows the wheelbase of the vehicle to be extended or reduced relative to its normal wheelbase. Similarly, the housing may be adapted to hold the idler gear sub-assembly in a first position or in a second position that is different from the first position in which the idler gear sub-assembly is held.

The input gear sub-assembly is preferably provided in a position effective to properly receive and be driven by an incoming driveshaft. The output gear sub-assembly is preferably provided in a position effective to properly drive an output shaft or wheel hub. The idler gear sub-assembly is preferably provided in a position effective to connect the input gear sub-assembly to the output gear sub-assembly, and preferably to adapt to changes in the size or location of either or both of those sub-assemblies.

As previously mentioned, when the input and/or output gears are changed for gears having a larger or smaller size and/or number of teeth, the spacing between the input and output gears typically also changes. This typically requires moving the idler gear to a different position/location in the housing, so that the linkage between the input gear and the output gear through the idler gear is maintained with the different input/output gear sizes and spacing.

Accordingly, one aspect of the present invention provides a portal box assembly that allows the position of an idler gear to be changed to accommodate different input and output gears. In one embodiment the housing includes an indent adapted to receive a removable oblong adaptor that may receive and position an idler gear assembly in one position when the adaptor is positioned in the indent in a first position, and that may receive and position an idler gear assembly in a second and different position when the adaptor is positioned in a second position. Preferably, the adaptor is moved from its first position to its second position merely by "flipping" the adaptor in the indent (e.g., by turning the adaptor around its vertical or longitudinal axis) so that the opening that was previously in one position is now in another position.

It is to be appreciated that the foregoing description describes the invention in the context of a single input gear and a single idler gear. However, the principles and benefits of the present invention may also be applied to embodiments in which multiple idler gears are used. In particular, the invention finds utility in embodiments using dual idler gears, with one or both of those idler gears being moved or exchanged.

In this second "dual idler" embodiment, the portal box assembly allows the position of one or more (preferably two) idler gears to be changed to accommodate different input and output gears. In this embodiment the housing may include two indents, with each indent being adapted to receive a removable oblong adaptor that may receive and position an idler gear assembly in one position when the adaptor is positioned in the indent in a first position, and that may receive and position an idler gear assembly in a second and different position when the adaptor is positioned in a second position. Preferably, either or both of the adaptors may be moved from its first position to its second position merely by "flipping" the adaptor in the indent (i.e., spinning the adaptor 180° around its vertical axis so that the previously outward-facing side now faces inward, or spinning the adaptor 180° around its longitudinal axis so that the side that was previously on the left is now on the right).

Additionally, in the previously described embodiments, the gears that are initially used in the portal are swapped out with other gears to change the ratio. In an alternative embodiment, the gear ratios may be changed without the need to obtain more parts. For example, the gearbox may have an input gear and one or more idler gears that have the same internal features with respect to mounting on a shaft, but a differing number of teeth on the outside diameter. Then, using the alternate idler gear shaft position described above, the idler and input gear could be swapped to change the ratio. For example, FIGS. 4A and 4B below show an embodiment in which the input and idler gears are switched, while FIGS. 5A and 5B show an embodiment in which the input and output gears are switched, in both cases changing the gear ratio provided by the assembly.

Accordingly, the "gear swapping" concept may be applied to embodiments in which multiple idler gear indents are used to allow the idler gear(s) to be located at either of two or more selected locations. In these embodiments, the input gear assembly may comprise a first gear contained in a first bearing assembly, a second gear contained in a second bearing assembly, and one or more idler gears contained in one or more additional bearing assemblies. In this embodiment, the housing may include a first gear indent adapted to receive the assembly for the gear acting as the input gear, and to hold it in a first input gear position within the housing. The housing may also include a second gear indent adapted to receive the assembly for the gear acting as the output gear, and to hold it in a first output gear position within the housing. The housing may also include a third gear indent adapted to receive the assembly for a gear acting as the idler gear, and to hold it in a first idler gear position within the housing, and a fourth gear indent adapted to receive the assembly for the gear acting as the idler gear, and to hold it in a second idler gear position different from the first idler gear position. To switch the gears, the gear that was initially used as the input gear (for example) may be exchanged with a gear that was initially used as an idler gear (for example), and may be positioned in either of the appropriate indents. After the exchange, the gear ratio is changed.

Similarly, the "gear swapping" concept may be applied to embodiments in which the "flippable adaptor" is used. In these embodiments, the flippable adaptor is sized to accommodate a gear initially acting as the idler gear, when the adaptor is used in one position, but is also sized to accommodate the gear initially acting as the input gear when the adaptor is flipped. Accordingly, when it is desired to swap the gear acting as the initial input gear with the gear acting as the initial idler gear, the flippable adaptor is flipped and the new gear placements are provided.

Referring now to the drawings, FIG. 1 is an exploded view of a portal gear box for an all-terrain vehicle or a utility task vehicle, according to one embodiment of the present invention. Assembly 100 includes a portal gear box comprising a main housing 110. Gears 130 are contained in housing body 110. Input shaft 145 enters housing body 110 and drives input gear 131. Output shaft 135 exits housing cover 120 and is driven by output gear 132. Linking/idler gear 133 connects input gear 131 to output gear 132, thus allowing output shaft 135 to be driven by the rotation of input shaft 145. Cover 120 may be used to close and seal housing body 110.

Output shaft 135 drives wheel hub 150, which powers the vehicle. Backing plate 140 may be used to mount portal gear box 110 on the vehicle, and may include an opening 141 for the input shaft (which may be a vehicle axle).

Figure 2A:
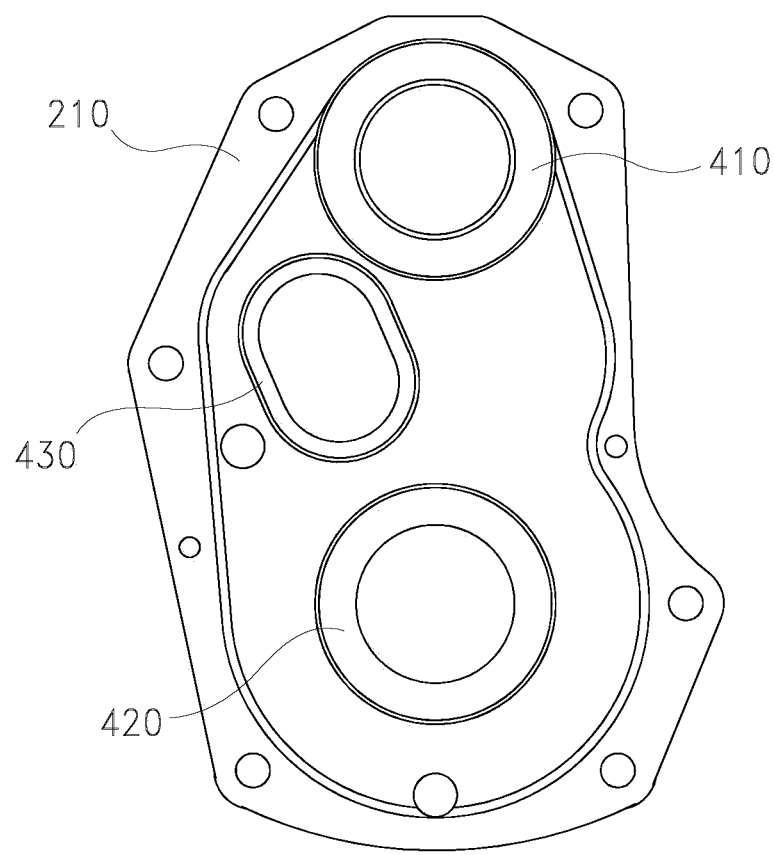
FIG. 2A is a view of the interior of a portal gear box for an all-terrain vehicle or a utility task vehicle, showing indents for gears and/or a removable gear adaptor contained therein.
Figure 2B:
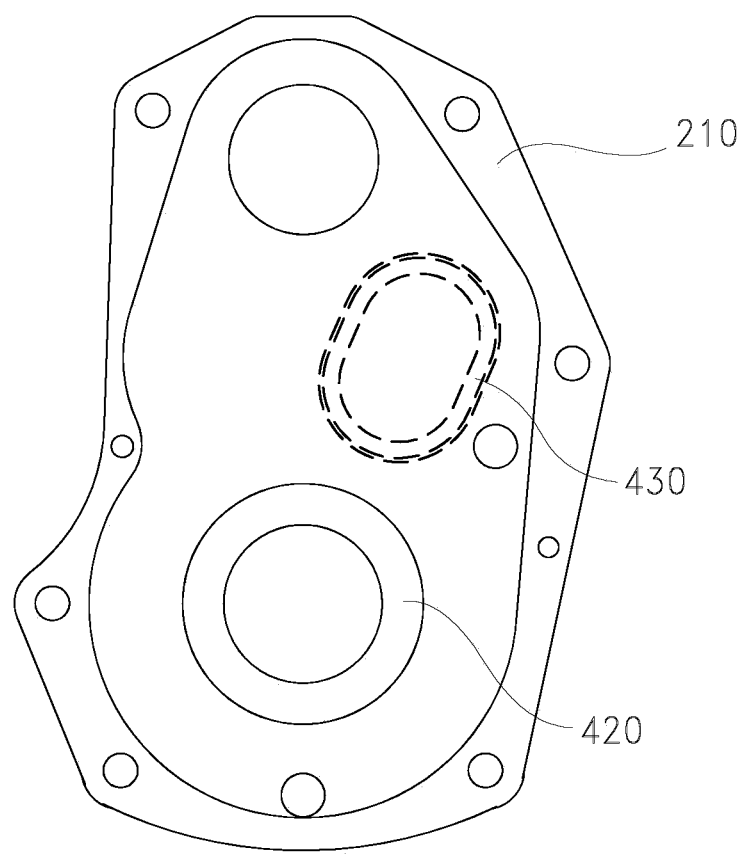
FIG. 2B is a view of the exterior of a portal gear box for an all-terrain vehicle or a utility task vehicle, showing an indent for holding and positioning a removable gear adaptor in phantom.
Figure 2C:
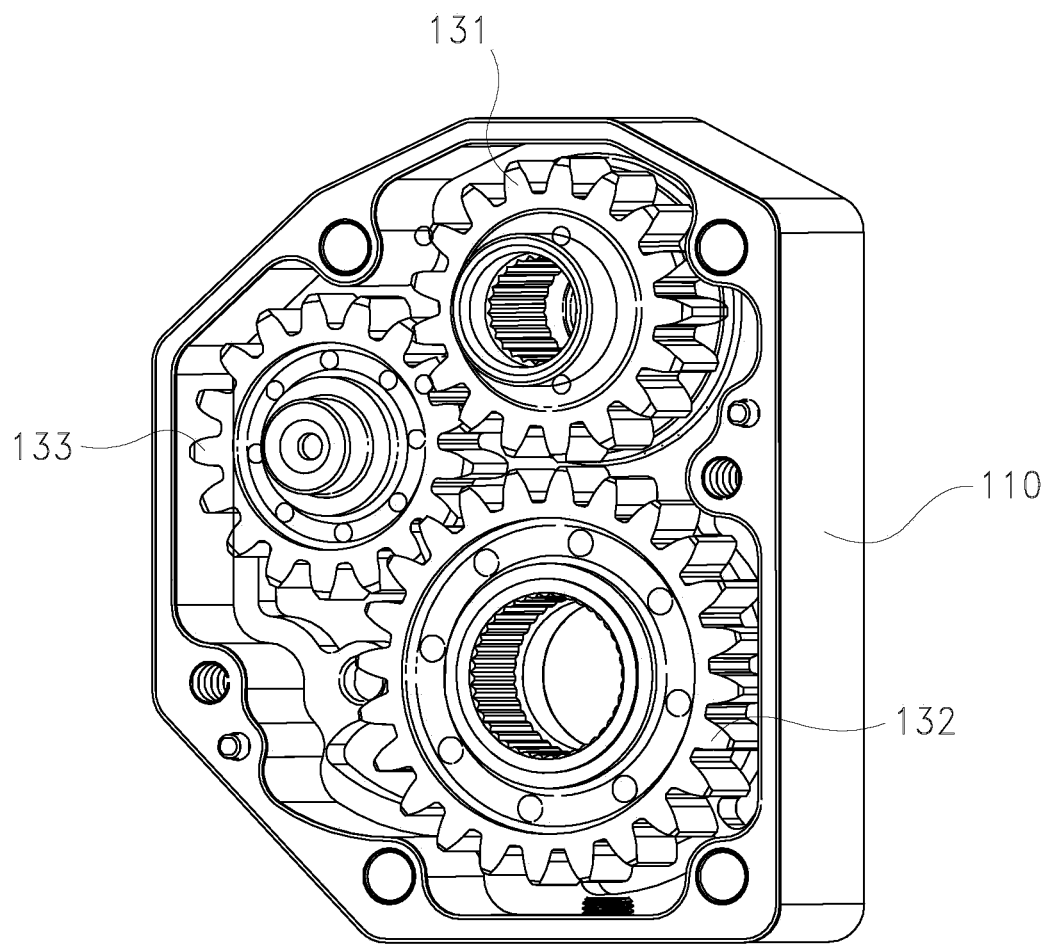
FIG. 2C is a view of the interior of a portal gear box for an all-terrain vehicle or a utility task vehicle, showing gears contained therein.

FIGS. 2A and 2B are views of the interior of a portal gear box for an all-terrain vehicle or a utility task vehicle, showing indents for the gear assemblies. Housing 110 contains indent 210 for the input gear assembly, which is connected to and powered by input shaft 145, and indent 220 for the output gear assembly, which is connected to and powers output shaft 135. Indent 230 positions adaptor 300, which positions idler/linking gear 133, which connects input gear 131 to output gear 132. Indent 230 allows adaptor 300 to be flipped from one side to the other, thus allowing idler gear 133 to be positioned in either a first or a second position, and allowing various sizes of idler/linking gears to be used.

Figure 3A:
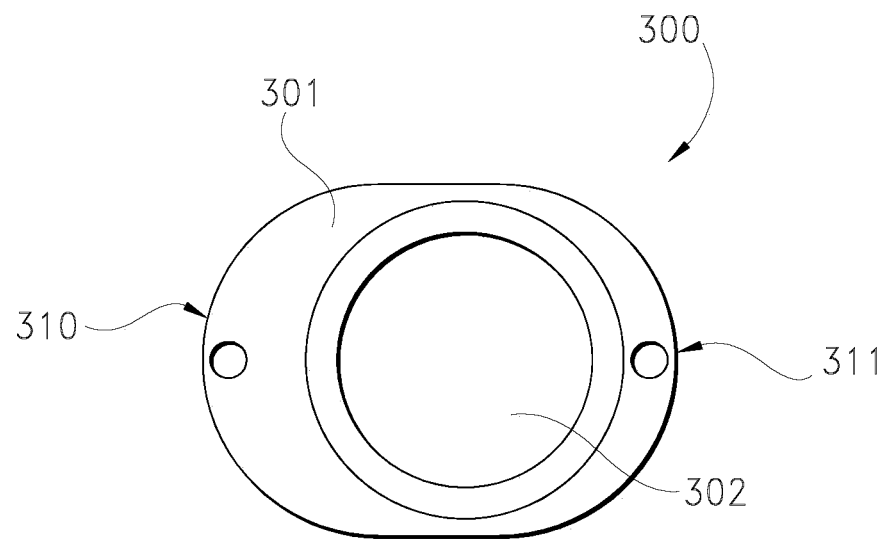
FIG. 3A is a view of a removable adaptor used to hold an idler gear in its selected position, according to one embodiment of the present invention.

FIG. 3A shows a removable adaptor used to hold an idler gear in its selected position, according to one embodiment of the present invention. Removable adaptor 300 includes a body 301 defining an opening 302 effective to receive and position an idler/linking gear in a selected position. Opening 302 is offset from the center of adaptor 300, being closer to the first end 311 than to the second end 310.

Figure 3B:
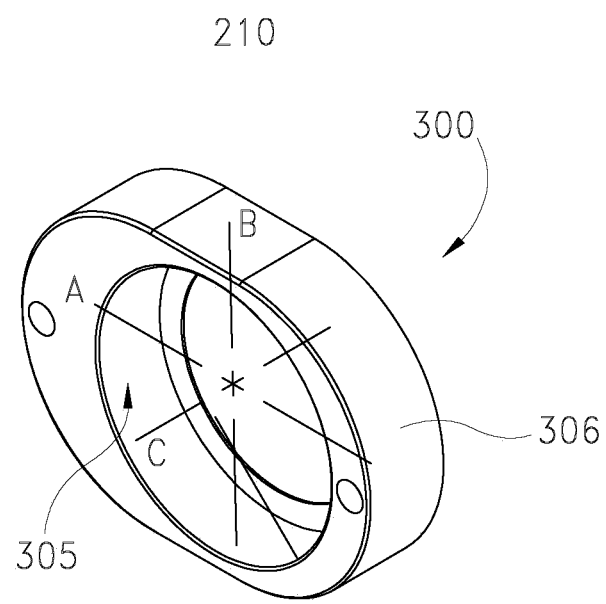
FIG. 3B is a view of a removable adaptor used to hold an idler gear in its selected position, according to one embodiment of the present invention.

FIG. 3B is another perspective views of removable adaptor 300, according to one embodiment of the present invention. Removable adaptor 300 includes a body having an outer wall 306 and an inner wall 305 which defines opening 302 that is effective to receive and position an idler/linking gear in a selected position. Axes A, B, and C refer to the lateral, vertical, and longitudinal axes, respectively.

Figure 4A:
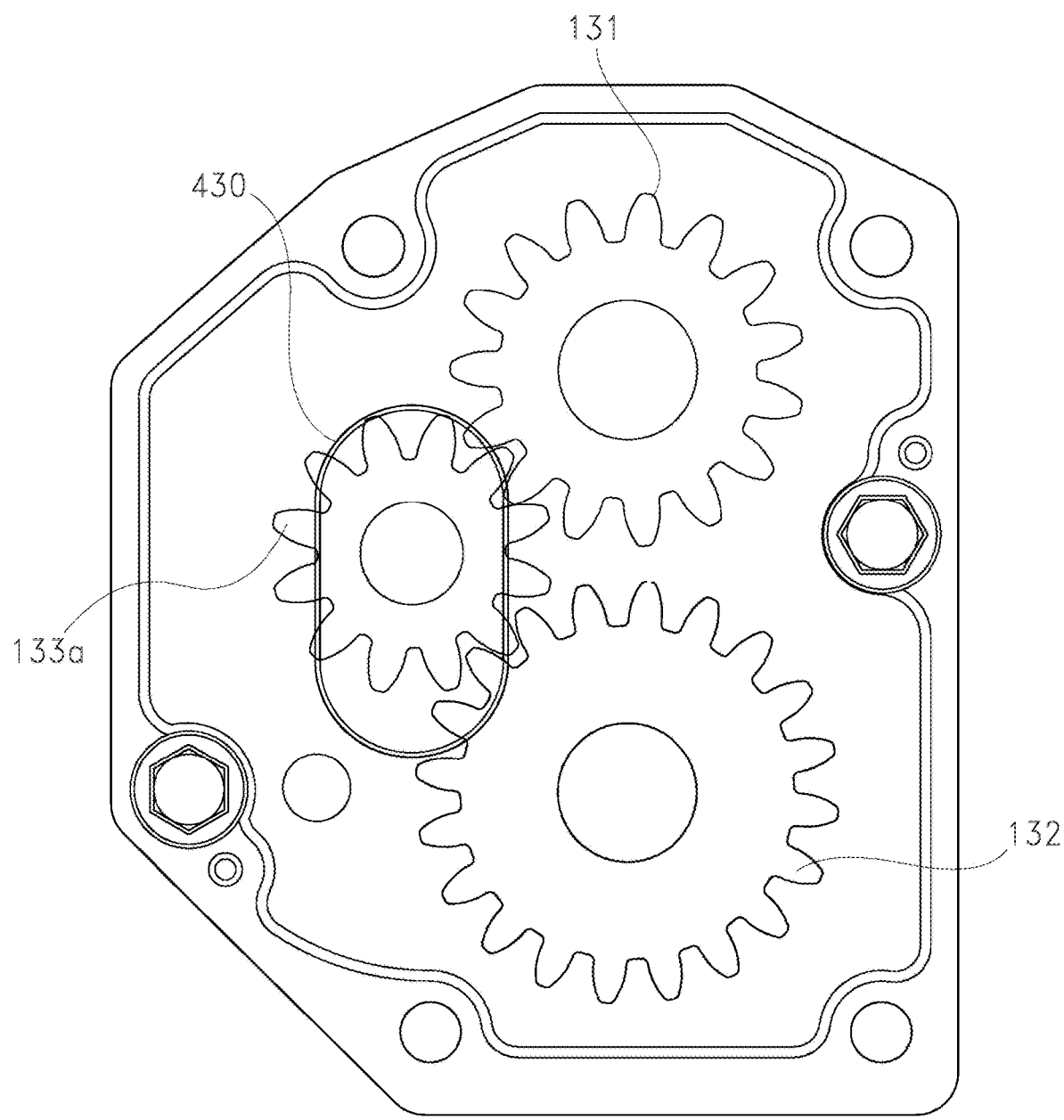
FIG. 4A shows a portal gear box assembly with the removable adaptor holding an idler gear in a first position, according to one embodiment of the present invention.
Figure 5A:
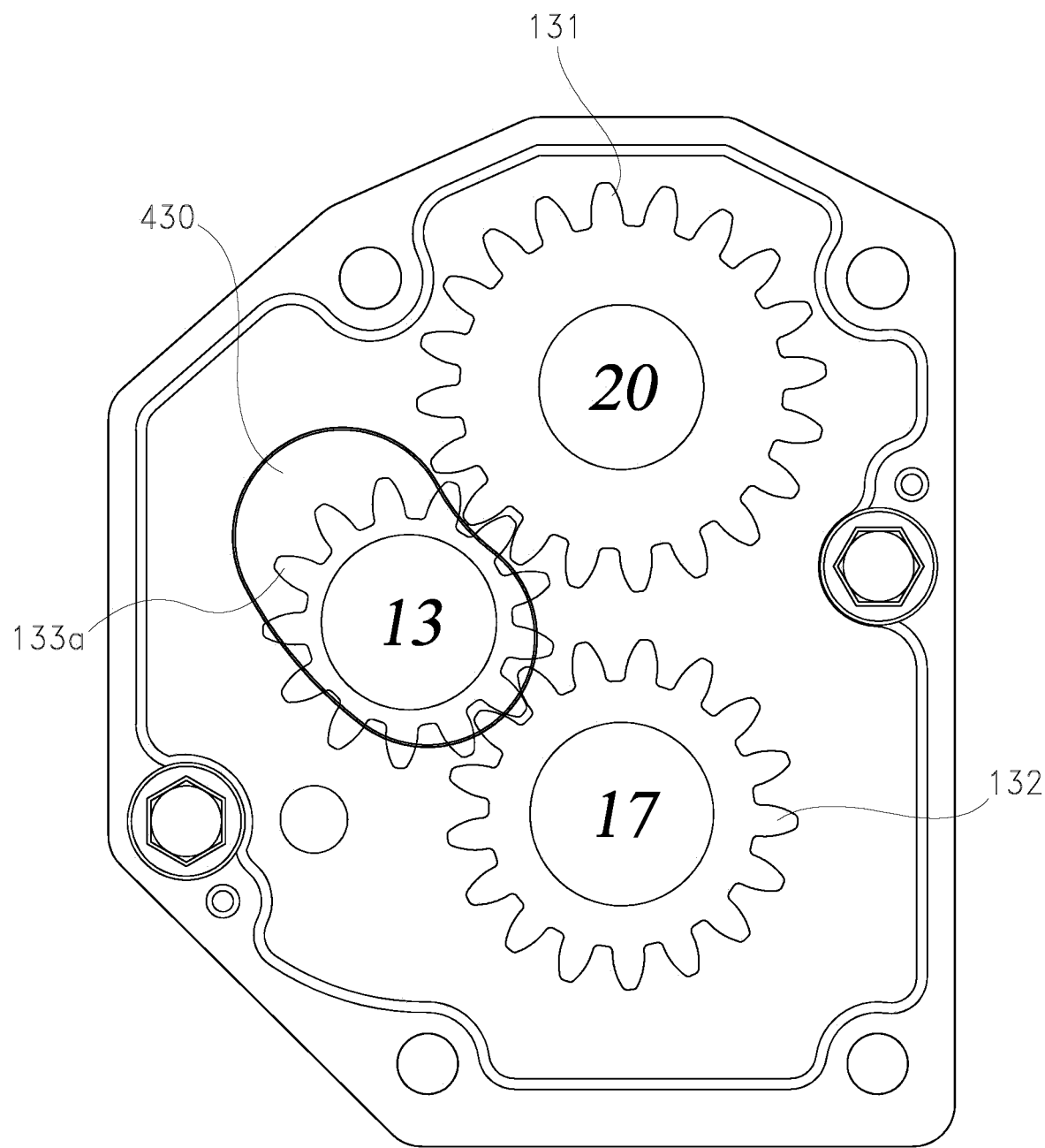
FIG. 5A shows a portal gear box assembly with the removable adaptor holding an idler gear in a first position, according to one embodiment of the present invention.
Figure 5B:
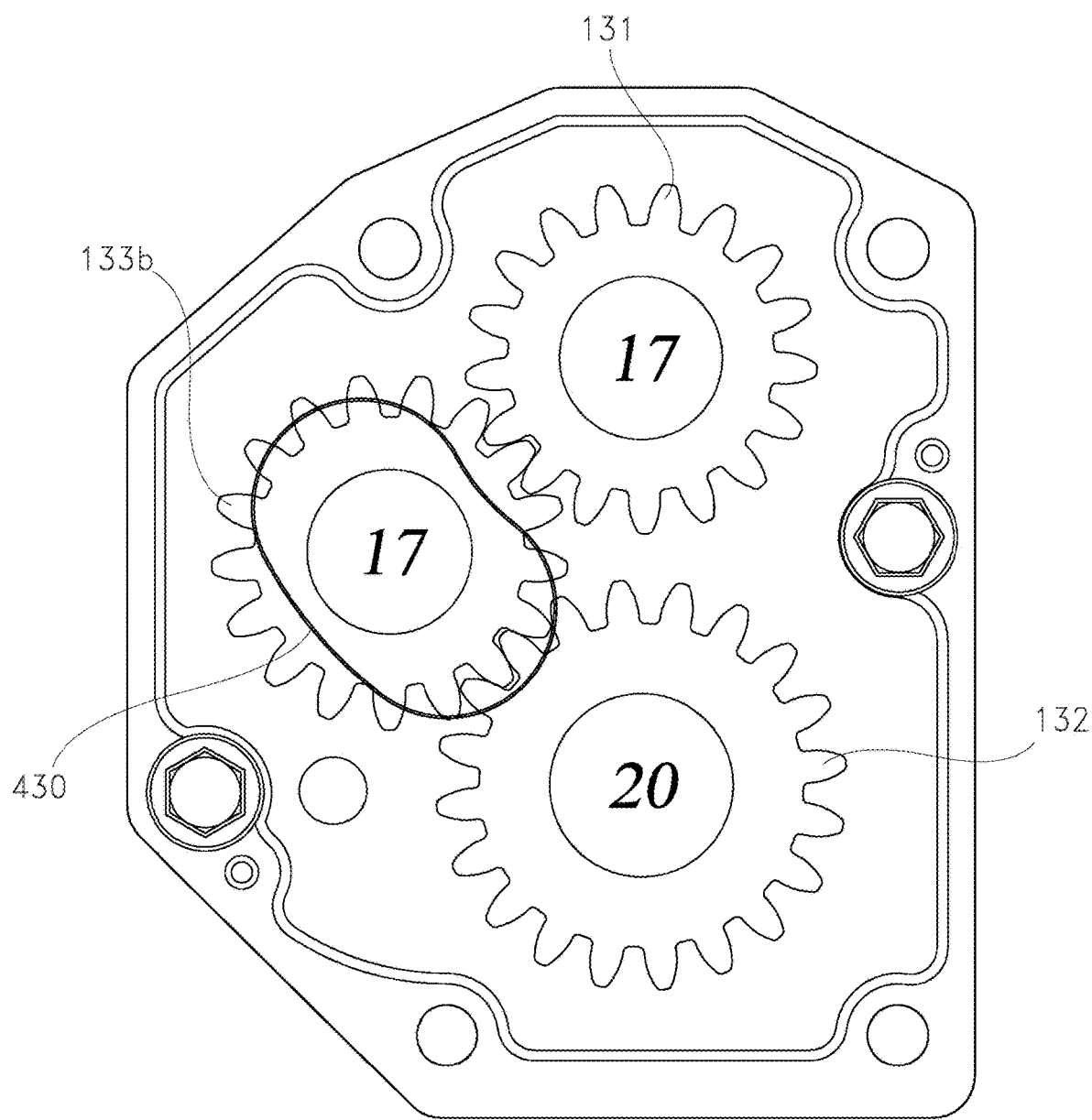
FIG. 5B shows the portal gear box assembly of FIG. 5A with the removable adaptor being flipped and holding an idler gear in a second position, different from the first position, according to one embodiment of the present invention.

FIG. 4A shows a portal gear box with the removable adaptor holding an idler gear in a first position, according to one embodiment of the present invention. Gears 130 include input gear 131, which is connectable to and may be powered by an input shaft, and output gear 132, which is connectable to and may drive an output shaft. Idler/linking gear 133 connects input gear 131 to output gear 132. Indent 430 positions removable adaptor 300, which positions idler/ linking gear 133 in a first position. In the illustrated embodiment, input gear 131 is a 15-toothed gear, output gear 132 is a 20-toothed gear, and idler gear 133 is a 12-toothed gear.

Figure 4B:
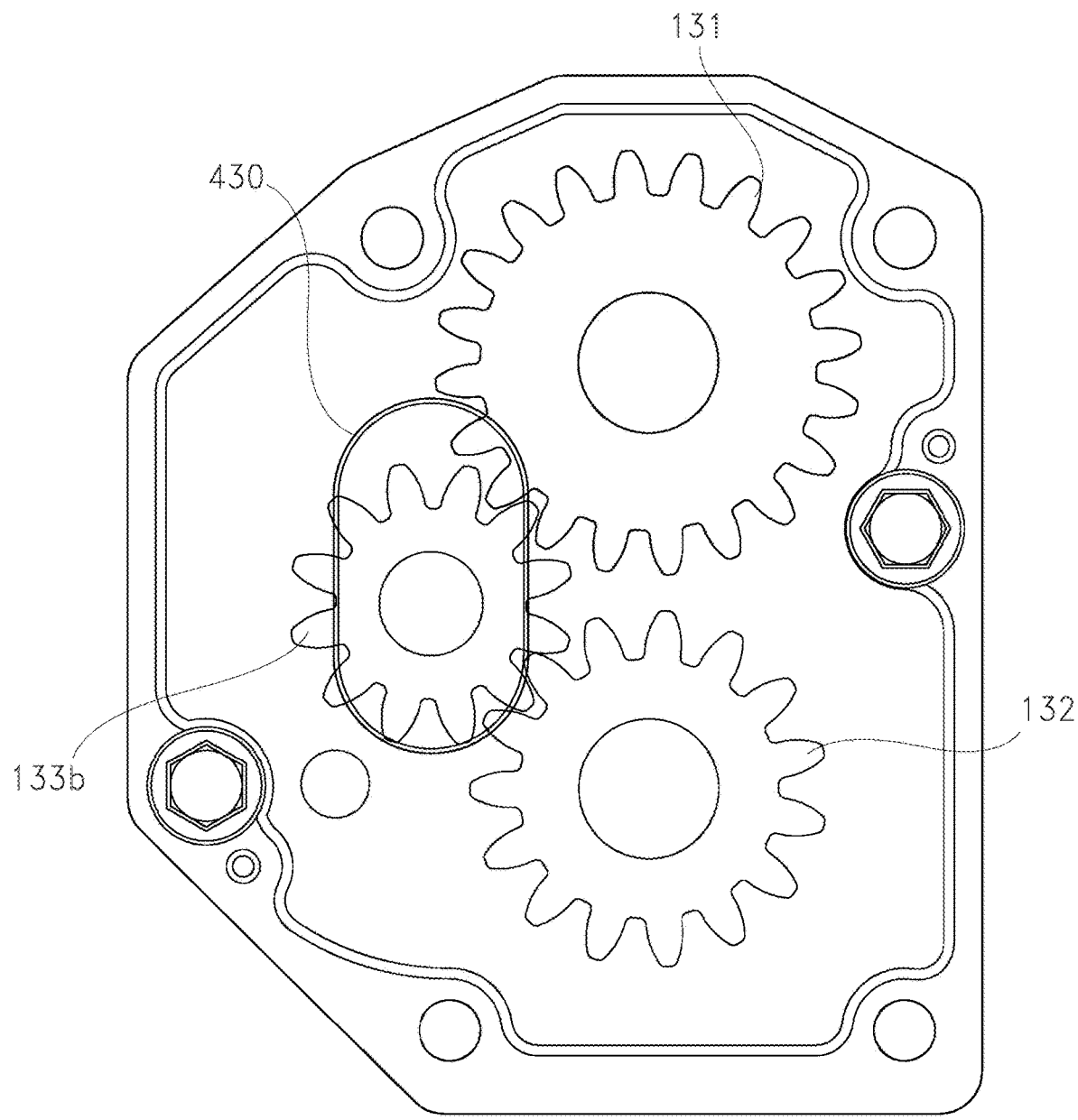
FIG. 4B shows the portal gear box assembly of FIG. 4A with the removable adaptor being "flipped" and holding an idler gear in a second position, different from the first position, according to one embodiment of the present invention.

FIG. 4B shows a portal gear box with the removable adaptor holding an idler gear in a second selected position different from the first position, according to one embodiment of the present invention. Gears 130 include input gear 131, which is connected to and powered by input shaft 145, and output gear 132, which is connected to and powers output shaft 135. Linking gear 133 connects input gear 131 to output gear 132. Indent 430 positions removable adaptor 300, which positions linking gear 133 in a second position, which is different from its first position. In the illustrated embodiment, the input and idler gears have been switched, so that input gear 131 is now a 20-toothed gear, and output gear 132 is now a 15-toothed gear. Idler gear 133 remains a 12-toothed gear. The location of the center of idler gear 133 is in a different position than it was in FIG. 4A by virtue of the adaptor 300 being flipped. In the illustrated embodiment, the center of idler gear 133 moves upward when adaptor 300 is flipped.

FIG. 5A shows a portal gear box with the removable adaptor holding an idler gear in a first position, according to one embodiment of the present invention. Gears 130 include input gear 131, which is connectable to and may be powered by an input shaft, and output gear 132, which is connectable to and may drive an output shaft. Idler/linking gear 133 connects input gear 131 to output gear 132. Indent 430 positions removable adaptor 300, which positions idler/linking gear 133 in a first position. In the illustrated embodiment, input gear 131 is a 20-toothed gear, output gear 132 is a 17-toothed gear, and idler gear 133 is a 13-toothed gear.

FIG. 5B shows a portal gear box with the removable adaptor holding an idler gear in a second selected position different from the first position, according to one embodiment of the present invention. Gears 130 include input gear 131, which is connected to and powered by input shaft 145, and output gear 132, which is connected to and powers output shaft 135. Idler/linking gear 133 connects input gear 131 to output gear 132. Indent 230 positions removable adaptor 300, which positions idler/linking gear 133 in a second position, which is different from its first position. In the illustrated embodiment, the input and output gears have been switched, and idler gear 133b replaces idler gear 133a. Accordingly, input gear 131 is now a 17-toothed gear, output gear 132 is now a 20-toothed gear, and idler gear 133 has been switched to a 17-toothed gear. The location of the center of idler gear 133 is in a different position than it was in FIG. 5A by virtue of the adaptor 300 being flipped.

Figure 6:
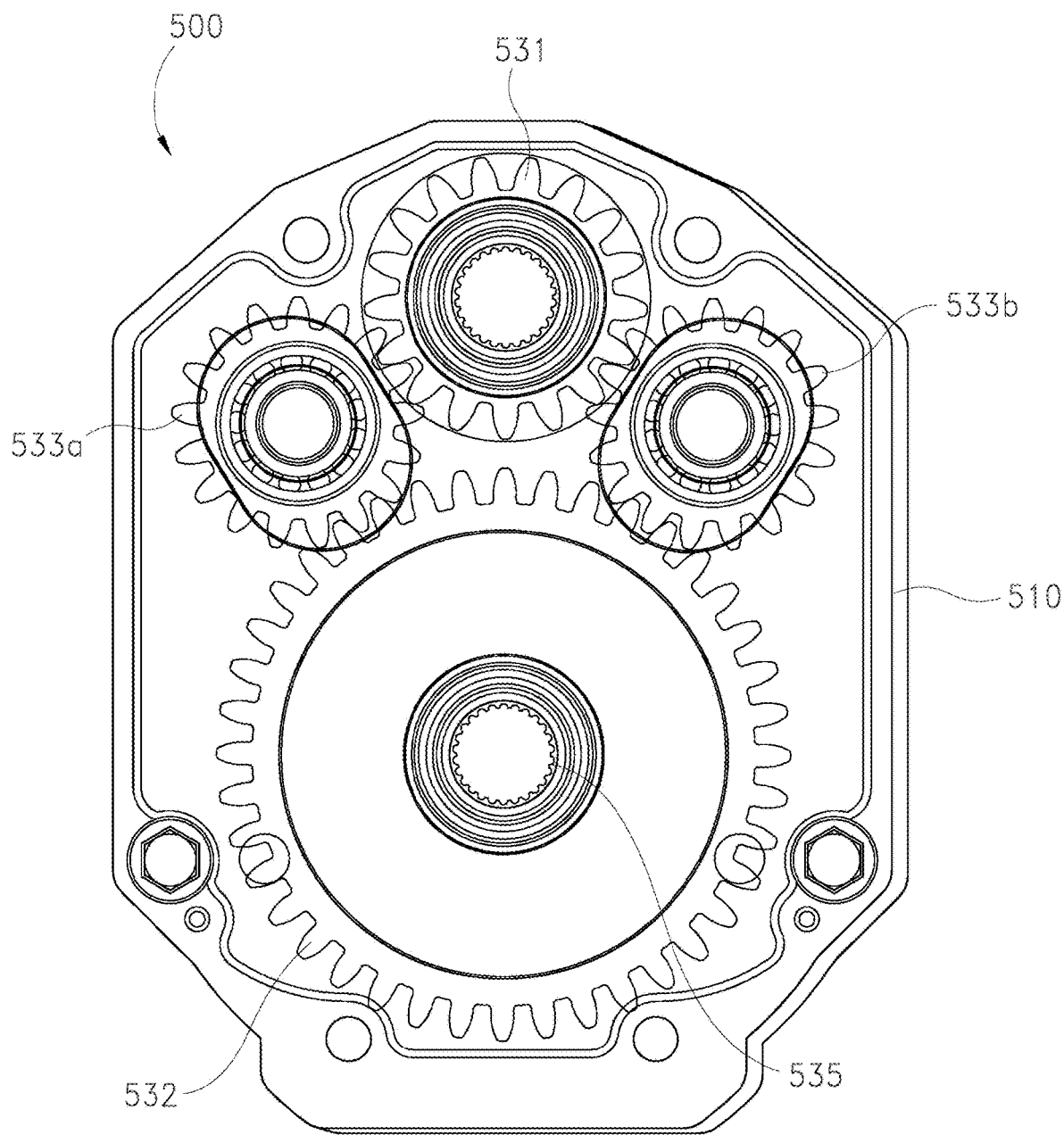
FIG. 6 shows a portal gear box with two removable adaptors, holding dual idler gears, according to one embodiment of the present invention.
Figure 7:
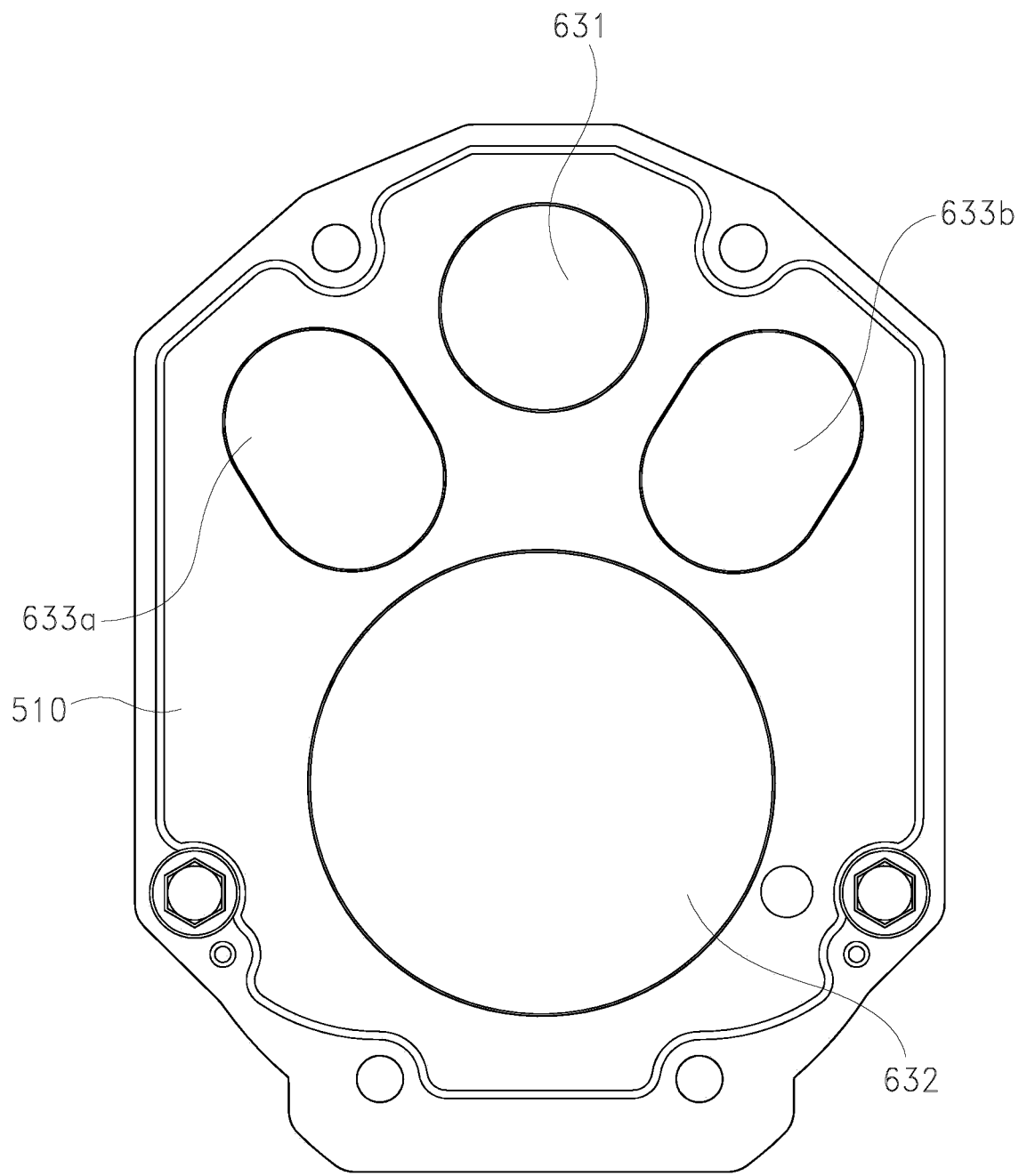
FIG. 7 shows a portal gear box with indents for two removable adaptors, adapted to hold dual idler gears, according to one embodiment of the present invention.

FIG. 6A shows a portal gear box with two removable adaptors, holding dual idler gears, according to one embodiment of the present invention. Portal gear box assembly 500 comprises a housing 510 which is adapted to hold an input gear 531, which is connectable to and may be powered by an input shaft, and an output gear 532, which is connectable to and may drive output shaft 535. Dual linking/idler gears 533a and 533b are used to connect input gear 531 to output gear 532, giving the assembly a more robust construction. Indents may be provided to position one or more (preferably two) removable adaptors, which receive and position linking gears 533a and/or 533b in either of two selected positions.

FIG. 6B shows a portal gear box with indents for two removable adaptors, adapted to hold dual idler gears, according to one embodiment of the present invention. Indents 633a and 633b are provided to hold and position adaptors 300 in either of two selected positions, as previously described.

The foregoing drawings illustrate the use of an oblong adaptor to receive and position the idler gear in one position when the adaptor is positioned in a first position, and to receive and position the idler gear in a second and different position when the adaptor is positioned in a second position. In the illustrated embodiment, the adaptor can be moved from its first position to its second position merely by "flipping" the adaptor so that the center of the opening is in a different position with respect to the center of the adaptor body. The oblong adaptor may have straight walls as illustrated by FIGS. 3A and 3B, or the adaptor may have a kidney shape as illustrated by FIGS. 5A and 5B. In other embodiments, other adaptor shapes may be used to facilitate positioning the idler gear in a different location when the adaptor is flipped.

In another embodiment, the housing includes two receptacles (or indents or openings) for one or more of the gears. With that embodiment, a gear can be put in one of the two receptacles when it is desired to position the gear in a first location, and the gear can be put in the other of the two receptacles when it is desired to position the gear in a second location. That avoids the need for an adaptor while still allowing one or more of the gears to be positioned in multiple locations so that an appropriate location can be selected when that (or another) gear is changed to provide a different gear ratio in the box. As with the "adaptor" embodiments, this "dual receptacle/indent" embodiment may be used with one or more idler gears, including dual idler gear embodiments.

Figure 8:
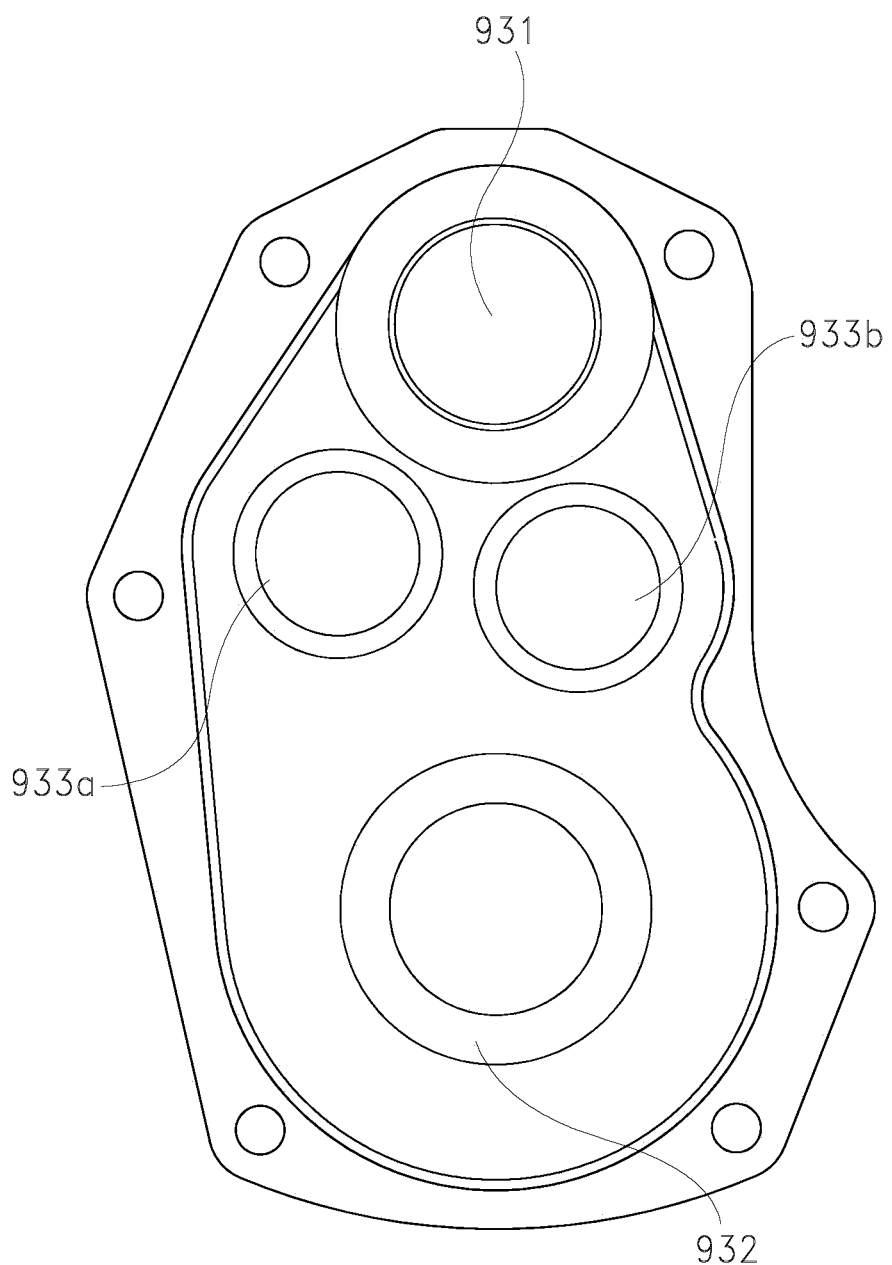
FIG. 8 shows a portal gear box assembly with indents for positioning the idler gear in either of two positions, thus facilitating changing of the various gears without using a removeable idler gear adaptor.

FIG. 8 shows a portal gear box assembly with indents for positioning the idler gear in either of two positions, thus facilitating changing of the various gears without using a removeable idler gear adaptor. The input shaft and associated input gear are positioned in space 931, while the output shaft and associated output gear are positioned in space 932. Indent 933a allows an idler gear to be positioned in a first position with respect to spaces 931 and 932, and indent 933b allows an idler gear to be positioned in a second position with respect to spaces 931 and 932.

While the invention has been illustrated and described in detail in the drawings and foregoing description, the same are to be considered as illustrative and not restrictive; it being understood that only certain preferred embodiments have been shown and described and that all changes and modifications that come within the spirit of the invention are desired to be protected. In addition, it is to be appreciated that the present invention may comprise or consist essentially of any or all of the described or illustrated elements and/or features. For example, the present invention includes devices and methods comprising any or all of the elements and/or features described or illustrated in specification or drawings, and the present invention includes devices and methods consisting essentially of any or all of the elements and/or features illustrated in the specification or drawings. Additionally, any or all of the elements and/or features and/or embodiments disclosed herein may be combined with any or all of the other elements and/or features and/or embodiments disclosed herein to provide a device or method that comprises or consists essentially of such elements and/or features.

For clarity, when the grammatical device "and/or" (such as in "A and/or B") is used in this disclosure, it is intended to mean A alone, or B alone, or both A and B.

The invention claimed is:

1. A portal gear box assembly for an off-road vehicle that includes a driven shaft, the assembly comprising:
   a housing that defines an first indent, an second indent, a third indent and a fourth indent;
   a first gear subassembly comprising a first gear operably connected to the driven shaft, wherein the first gear subassembly is positioned within the first indent;
   a second gear subassembly comprising a second gear operably connected to an output shaft, wherein the second gear subassembly is positioned within the second indent; and
   the idler-gear subassembly comprising a removable adaptor and a third gear connecting the first gear to the second gear;

wherein the removable adaptor is selectively positionable in either the third indent or the fourth indent to change a position of the third gear in the idler-gear subassembly relative to the first gear and second gear, thereby permitting use of gears with different diameters and different numbers of teeth to alter a transmission ratio between the driven shaft and the output shaft.

2. The portal gear box assembly of claim 1, wherein the transmission ratio between the driven shaft and the output shaft is adjustable by swapping the position of the first and second gears so that the first gear is connected to the output shaft in the second indent and the second gear is connected to the driven shaft in the first indent.

3. The portal gear box assembly of claim 2, where the transmission ratio between the driven shaft and the output shaft is further adjustable by changing the size of the third gear.

4. The portal gear box assembly of claim 1, wherein the third gear has fewer teeth than both the first gear and the second gear.

5. The portal gear box assembly of claim 1, wherein the third indent is positioned on a first side of an axis running through the first and second indents and the fourth indent is positioned on a second side of the axis, opposite the first side.

6. The portable gear box assembly of claim 1, wherein the removable adaptor has an outer profile that defines a circular shape.

7. The portable gear box assembly of claim 1, wherein a distance between the second indent and the third indent is different than a distance between the second indent and the fourth indent.

8. The portable gear box assembly of claim 1, wherein the portable gear box is adapted for use on an all-terrain vehicle (ATV) or a utility task vehicle (UTV).

9. A method for changing the transmission ratio of a portal gear box, the method comprising:

removing at least one of the first gear and/or the second gear from the claim 1 portal gear box assembly;
replacing the at least one removed gear with a different gear;
moving the idler-gear subassembly to a different third or fourth indent thereby permitting use of first and second gears with different diameters and different numbers of teeth to alter a transmission ratio between the driven shaft and the output shaft.

10. The method of claim 9, further comprising removing and replacing both the first gear and second gear with different gears defining a different diameter and/or a different number of teeth.

11. The method of claim 9, further comprising swapping the position of the first and second gears.

12. A portal gear box kit with an adjustable transmission ratio, the portal gear box kit comprising:
a housing that defines a first indent, a second indent, a third indent and a fourth indent;
a first gear adapted to couple to a driven shaft extending through the first indent;
an output shaft adapted to extend through the second indent;
a second gear adapted to couple to the output shaft;
a removable adaptor adapted to be selectively positioned in either the third indent or the fourth indent;
a third gear adapted to couple to the removable adaptor;
wherein positioning the removable adaptor in either the third indent or the fourth indent changes a position of the third gear coupled to the removable adapted relative to the first indent and the second indent thereby permitting use of first and second gears with different diameters and different numbers of teeth to alter a transmission ratio between the driven shaft and the output shaft when the kit is assembled as a portal gear box.

* * * * *